United States Patent
Gharagozloo et al.

(10) Patent No.: US 12,522,368 B2
(45) Date of Patent: Jan. 13, 2026

(54) ENGINE CONTROL SYSTEM AND METHOD WITH ARTIFICIAL INTELLIGENCE SENSOR TRAINING

(71) Applicant: Pratt & Whitney Canada Corp., Longueuil (CA)

(72) Inventors: Alireza Gharagozloo, Boucherville (CA); Roja Tabar, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 650 days.

(21) Appl. No.: 17/899,180

(22) Filed: Aug. 30, 2022

(65) Prior Publication Data

US 2024/0067350 A1    Feb. 29, 2024

(51) Int. Cl.
*B64D 29/00*    (2006.01)
*B64D 31/00*    (2006.01)
*B64D 47/00*    (2006.01)

(52) U.S. Cl.
CPC ............ *B64D 31/00* (2013.01); *B64D 47/00* (2013.01)

(58) Field of Classification Search
CPC ........ B64D 31/00; B64D 47/00; B64D 29/00; G05B 15/02; G05B 23/0254
USPC .......................................................... 701/13
See application file for complete search history.

(56) References Cited

U.S. PATENT DOCUMENTS

| | | | |
|---|---|---|---|
| 7,660,774 B2 | 2/2010 | Mukherjee | |
| 8,065,022 B2 | 11/2011 | Minto | |
| 2006/0212281 A1 | 9/2006 | Mathews, Jr. | |
| 2007/0118270 A1 | 5/2007 | Wiseman | |
| 2017/0298759 A1 | 10/2017 | Masuda | |
| 2018/0268288 A1 | 9/2018 | Vandike | |
| 2019/0147412 A1* | 5/2019 | Chiaramonte | G06Q 10/20 705/7.13 |
| 2019/0309689 A1* | 10/2019 | Meisner | F02C 9/54 |
| 2020/0248622 A1* | 8/2020 | Crowley | G05B 13/027 |
| 2020/0284265 A1 | 9/2020 | Reepmeyer | |
| 2022/0186666 A1 | 6/2022 | Diaz | |

OTHER PUBLICATIONS

EP Search Report for EP Patent Application No. 23194352.3 dated Jan. 25, 2024.

* cited by examiner

*Primary Examiner* — Shardul D Patel
(74) *Attorney, Agent, or Firm* — Getz Balich LLC

(57) ABSTRACT

A system and method for controlling an aircraft engine is provided. The method includes a) producing first sensor data using a first sensor sensing a first parameter during operation of the aircraft engine on a flight mission; b) producing other sensor data using a plurality of second sensors sensing a plurality of other parameters, during operation of the aircraft engine; c) providing the first and other sensor data to a control unit during operation of the aircraft engine; d) storing the first and other sensor data during operation of the aircraft engine; e) using an artificial intelligence (AI) model that is trained using the stored first and other sensor data produced during operation of the aircraft engine, to produce one or more derived first parameter values; and f) selectively providing the one or more derived first parameter values to the control unit for use in controlling the aircraft engine.

20 Claims, 4 Drawing Sheets

ENGINE CONTROL SYSTEM AND METHOD WITH ARTIFICIAL INTELLIGENCE SENSOR TRAINING

BACKGROUND OF THE INVENTION

1. Technical Field

The present disclosure relates to engine control systems and methods in general, and to engine control systems and methods with artificial intelligence sensor training in particular.

2. Background Information

Modern aircraft electronic control systems include various control components, such as an Engine Control Unit (ECU), sensors that provide input signals to the ECU, and actuators commanded by ECU output signals to measure engine parameters. Sensors are sometimes mechanically prone to failures (e.g., FOD exposure, material fatigue, installation degradation etc.). Engine and aircraft manufacturers mitigate the potential for failure by using multiple sensors, albeit at an increase in cost and system complexity. Engine sensor failures can occur in a variety of different ways (e.g., sending out-of-range signals, mismatch errors, etc.) that can be detected with control system logic and be accommodated via the redundant source of the signal.

What is needed is an aircraft electronic control system that can identify and accommodate sensor malfunctions in a manner that will allow the system to continue to operate until the next maintenance opportunity.

SUMMARY

According to an aspect of the present disclosure, a method for controlling an aircraft engine is provided. The method includes a) producing first sensor data using a first sensor sensing a first parameter during operation of the aircraft engine on a flight mission; b) producing other sensor data using a plurality of second sensors sensing a plurality of other parameters, wherein each said other parameter is different from the first parameter, during operation of the aircraft engine on the flight mission; c) providing the first sensor data and the other sensor data to a control unit during operation of the aircraft engine on the flight mission; d) storing the first sensor data and the other sensor data during operation of the aircraft engine on the flight mission; e) using an artificial intelligence (AI) model that is trained using the stored said first sensor data and said other sensor data produced during operation of the aircraft engine on the flight mission, to produce one or more derived first parameter values based on the stored other sensor data produced during operation of the aircraft engine on the flight mission; and f) selectively providing the one or more derived first parameter values to the control unit for use in controlling the aircraft engine on the flight mission.

In any of the aspects or embodiments described above and herein, the one or more derived first parameter values may be provided to the control unit upon a request by the control unit.

In any of the aspects or embodiments described above and herein, the control unit may be configured to evaluate the first sensor data using the one or more derived first parameter values.

In any of the aspects or embodiments described above and herein, wherein the one or more derived first parameter values may be used in the control of the aircraft engine.

In any of the aspects or embodiments described above and herein, wherein each respective second sensor of the plurality of second sensors may be configured to sense a different parameter during operation of the aircraft engine on the flight mission.

In any of the aspects or embodiments described above and herein, wherein the AI model may be used to produce the one or more derived first parameter values based on the stored other sensor data and the first sensor data produced during operation of the aircraft engine on the flight mission.

In any of the aspects or embodiments described above and herein, wherein the one or more derived first parameter values may be continuously provided to the control unit.

In any of the aspects or embodiments described above and herein, wherein the one or more derived first parameter values may be used to evaluate the first sensor data during operation of the aircraft engine on the flight mission.

In any of the aspects or embodiments described above and herein, wherein the control unit may communicate information relating to the first sensor based on the evaluation, and that information may relate to maintenance.

In any of the aspects or embodiments described above and herein, the first parameter may be one of pressure, temperature, aircraft altitude, speed, acceleration, power, torque, weight, or aircraft ambient conditions, and each respective other parameter may be another of pressure, temperature, aircraft altitude, speed, acceleration, power, torque, weight, or aircraft ambient conditions.

According to another aspect of the present disclosure, a control system for an aircraft engine of an aircraft is provided that includes an electronic control unit (ECU), a first sensor, a plurality of second sensors, and an engine data recorder (EDR). The first sensor is disposed within the aircraft and is in communication with the ECU. The first sensor is configured to sense a parameter used in the control of the aircraft engine on a flight mission, and to produce first sensor data during operation of the aircraft engine on the flight mission. The plurality of second sensors is disposed within the aircraft and is in communication with the ECU. The plurality of second sensors is configured to sense a plurality of other parameters and produce other sensor data during operation of the aircraft engine on the flight mission, wherein each other parameter is different from the first parameter. The EDR is in communication with the ECU. The EDR has an artificial intelligence (AI) model having a database of first sensor data and other sensor data. The EDR is configured to produce one or more derived first parameter values using the other sensor data produced during the operation of the aircraft engine on the flight mission and selectively communicate the one or more derived first parameter values to the ECU for use in the control of the aircraft engine in the flight mission.

In any of the aspects or embodiments described above and herein, the one or more derived first parameter values may be communicated to the ECU upon a request by the ECU.

In any of the aspects or embodiments described above and herein, the ECU may be configured to evaluate the first sensor data using the one or more derived first parameter values.

In any of the aspects or embodiments described above and herein, each respective second sensor of the plurality of second sensors may be configured to sense a different parameter during operation of the aircraft engine on the flight mission.

In any of the aspects or embodiments described above and herein, the AI model may be configured to produce the one or more derived first parameter values based on the stored other sensor data and the first sensor data produced during operation of the aircraft engine on the flight mission.

In any of the aspects or embodiments described above and herein, the EDR may be configured to continuously provide the one or more derived first parameter values to the ECU.

In any of the aspects or embodiments described above and herein, the ECU may be configured to use the one or more derived first parameter values to evaluate the first sensor data during operation of the aircraft engine on the flight mission.

In any of the aspects or embodiments described above and herein, the ECU may be configured to communicate information relating to the first sensor based on the evaluation.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

The present disclosure is directed to systems and methods used to control operational aspects of an aircraft engine. Modern aircraft (fixed wing or rotary blade) utilize a variety of different types of engine control systems including, but not limited to full authority digital engine controls (FADEC), electronic engine controls (EEC), engine control units (ECU), digital engine controls (DEC) and the like. The present disclosure may be utilized in a variety of different engine control systems and is therefore not limited to use with any particular type of control system. To simplify the description herein, the present disclosure will be described in terms of an electronic control unit (ECU) but is not limited to use therewith.

Figure 1:
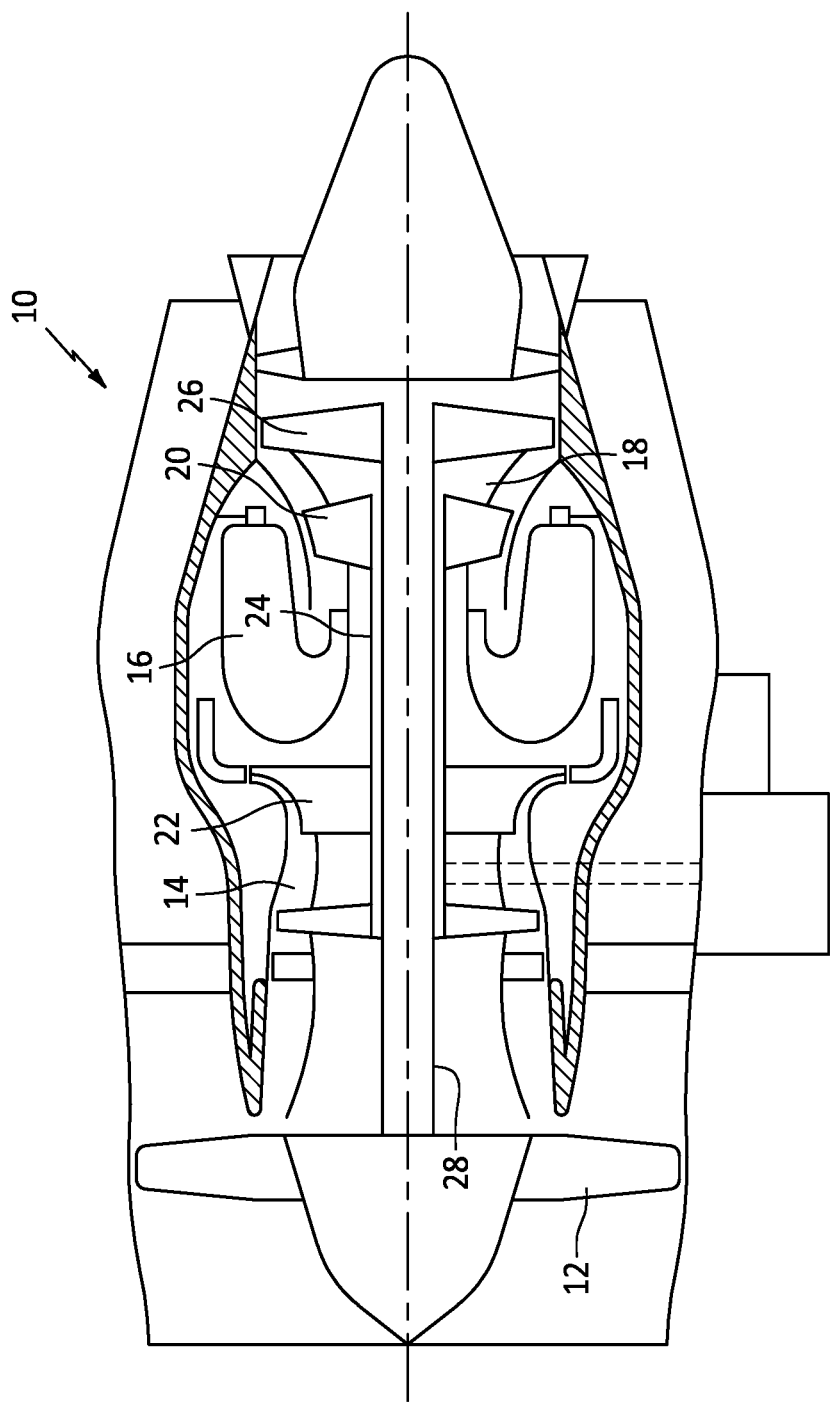
FIG. 1 is a diagrammatic sectional view of a gas turbine engine.

FIG. 1 illustrates an exemplary gas turbine engine 10 of a type preferably provided for use in subsonic flight. The engine 10 includes a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan 12 rotor and to other low pressure rotor(s) (not shown) of the compressor section 14 via a low pressure shaft 28. The low pressure shaft 28 may extend within the high pressure shaft 24 and rotates independently from the high pressure shaft 24. Although illustrated as a turbofan engine in FIG. 1, the present disclosure is applicable to a variety of other types of gas turbine engines including turboshaft engines as well as other types of aircraft engines such as auxiliary power units (APUs), rotary engines, electric engines, and hybrid electric propulsion systems having a propeller driven in a hybrid architecture (series, parallel, or series/parallel) or turboelectric architecture (turboelectric or partial turboelectric).

Figure 2:
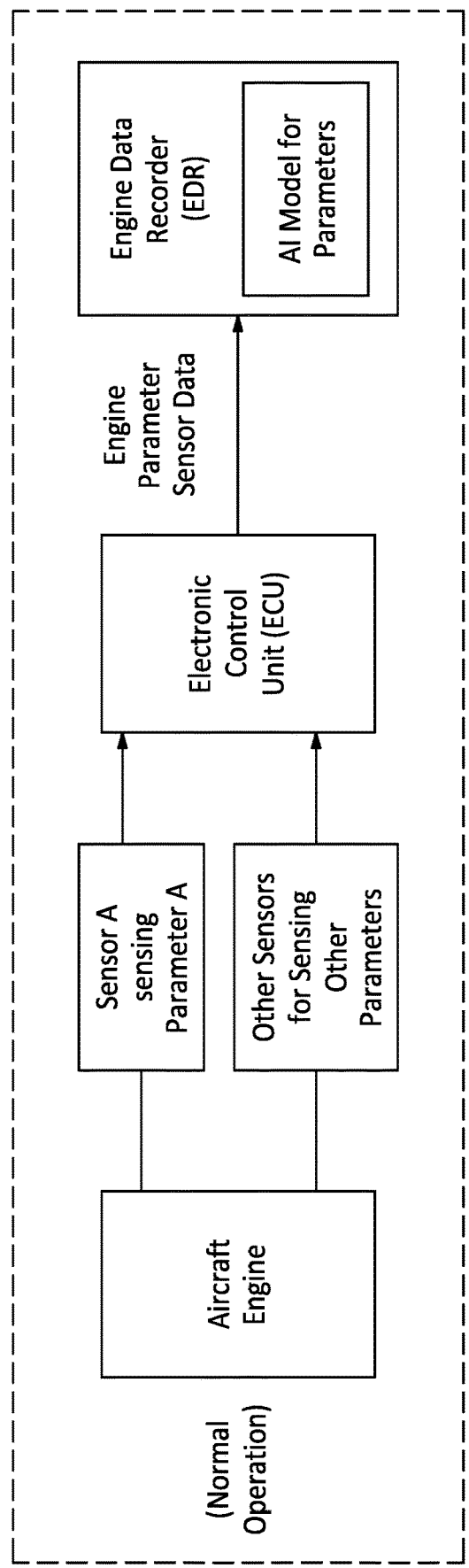
FIG. 2 is a schematic diagram of a present disclosure system embodiment.
Figure 3:
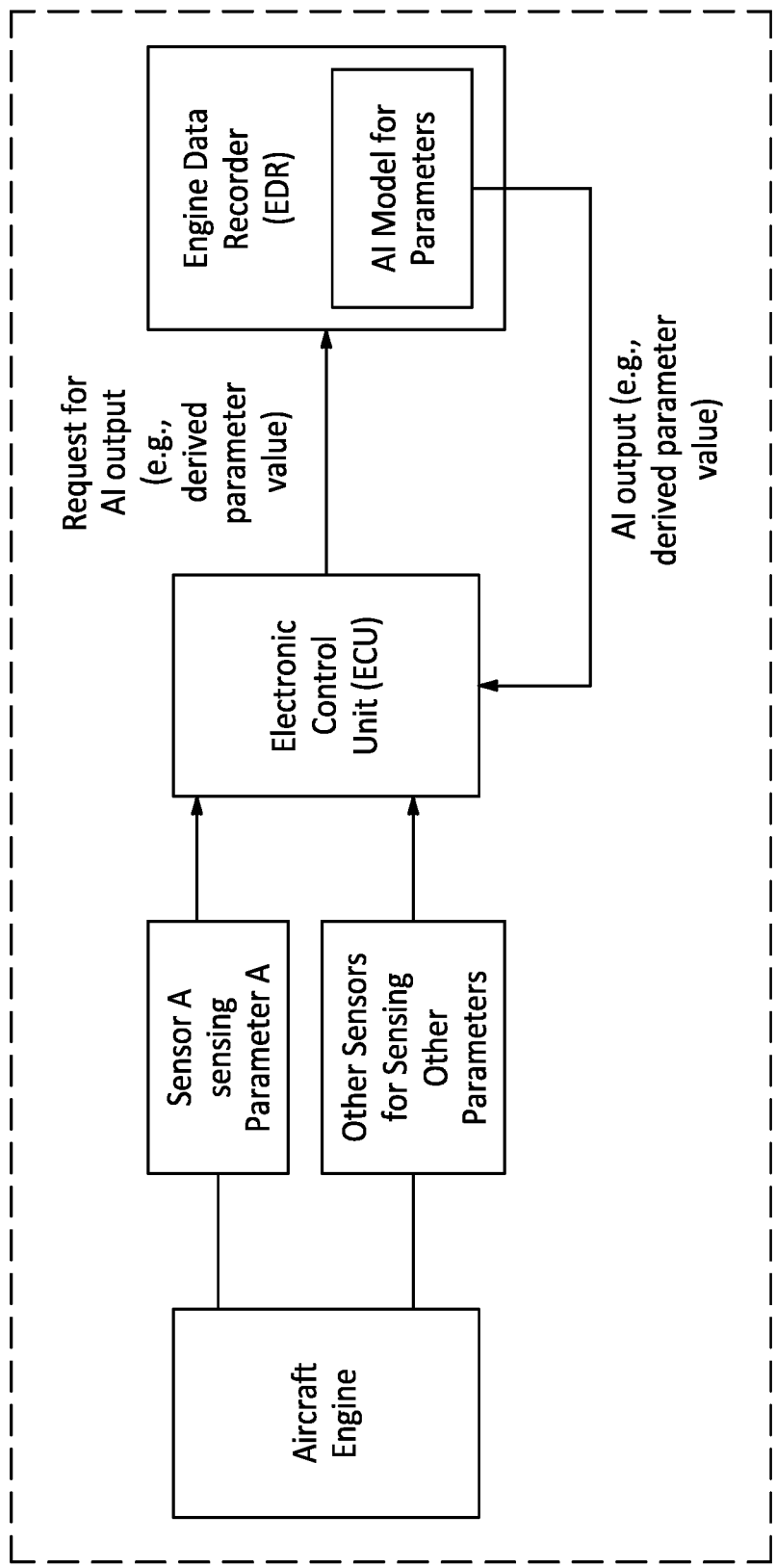
FIG. 3 is a schematic diagram of a present disclosure system embodiment.
Figure 4:
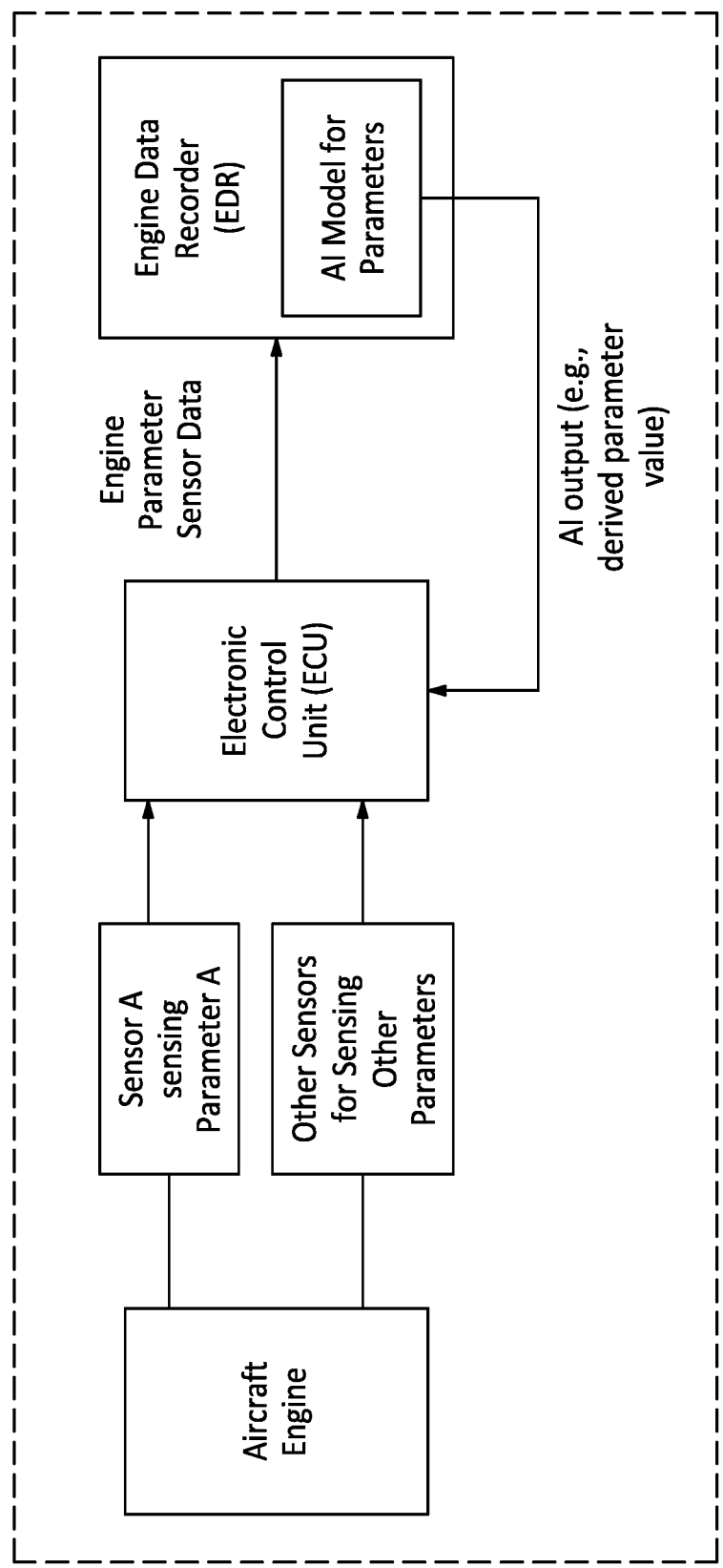
FIG. 4 is a schematic diagram of a present disclosure system embodiment.

FIGS. 2-4 schematically illustrate present disclosure system embodiments that include an aircraft (fixed wing or rotary blade). The aircraft has at least one engine (e.g., such as that shown in FIG. 1) and includes a plurality of sensors, including "Sensor A" for sensing a "Parameter A", and "Other Sensors" for sensing parameters other than Parameter A. The aircraft further includes an electronic control unit (ECU) and an engine data recorder (EDR). The schematic illustration of the aircraft having a Sensor A for sensing Parameter A and Other Sensors is for explanation purposes and to simplify the description herein. The present disclosure is not limited to any particular type of sensor. The term "parameter" as used herein (including Parameter A) is used to generically refer to any type of parameter that can be sensed in an aircraft application that may be considered by the ECU. Nonlimiting examples of parameters that may be sensed by a sensor (i.e., Sensor A or Other Sensors) include pressure (e.g., engine inlet total pressure, interstage pressure, engine pressure ratio or EPR), temperature (e.g., engine inlet total temperature, turbine inlet temperature, interstage temperature, engine exhaust gas temperature or EGT), altitude, speed (e.g., rotor speed of the engine's low-pressure rotor and high-pressure rotor, measured in RPM), acceleration, power, torque, flight and ambient conditions (e.g., ambient pressure and temperature), aircraft loading (e.g., weight of the aircraft, weight of fuel, etc., which may be determined directly or indirectly), and the like. The aforesaid sensors may be configured to produce signal data representative of the respective parameter in real-time or at regular intervals during a flight mission of the aircraft.

The ECU, EDR, and other components within the present disclosure system may each include a controller that may be in communication with other system components (e.g., sensors, effectors, etc.) to receive signals from and/or transmit signals to that component to perform the functions described herein. A controller may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. A controller may include or be in communication with one or more memory devices. The memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. Communications between the controller and other system components may be via a hardwire connection.

The ECU may include a controller and is configured to perform a variety of tasks, including receiving data signals from sensors that sense aircraft operating parameters such as those listed above. The ECU continuously analyzes the sensor data signal inputs and sends commands to control components (e.g., effectors such as solenoids, motors, actuators, valves, and the like) to control engine performance and provide the desired performance while keeping the engine within safe and efficient engine operating parameters. An ECU typically has the ability to automatically detect issues within the aircraft, an engine, or the ECU itself includes logic designed to mitigate those issues through backup functions or reverting to a safe operating state. The ECU also communicates data (e.g., engine parameter data produced by sensors, etc.) to the EDR. The data communicated by the ECU to the EDR may be raw data or processed data, or any combination thereof.

The ECU may be configured to communicate data to the EDR in real-time or at regular intervals during a flight mission of the aircraft. As used herein, the term "mission" refers to a flight to perform a specific task. The mission may be defined by various parameters, such as flight speeds, altitudes, duration, destination, weight, and any flying parameters to be used during the mission.

The EDR may include a controller and is configured to store sensor data communicated to the EDR from the ECU for the then current flight. The EDR includes an artificial intelligence (AI) model configured to model parameter data (e.g., such as Parameter A) under engine operating conditions, including on ground operating conditions and in flight operating conditions. Non-limiting examples of AI models include different types of AI models including statistical learning methods, or heuristic methods, or the like. The present disclosure is not limited to using any particular AI model. An AI model based on a supervised learning methodology is prepared using a training process that includes making predictions based on a body of data (e.g., a training set of labeled data) and refining those predictions until the model achieves a desired level of accuracy. The refining process typically includes testing and validating the model using the collected data. Embodiments of the present disclosure may, however, utilize an AI model based at least in part on an unsupervised learning methodology. In contrast to a supervised learning methodology, an unsupervised learning methodology utilizes unlabeled input data and makes predictions based on the input data to generate patterns that exists within the input data. The process of generating the patterns and ultimately a model may utilize various techniques (including networks), including but not limited to cluster analysis (e.g., hierarchical clustering, k-means, mixture models, DBSCAN, OPTICS, and the like) and principal component, etc. The present disclosure is not limited to using any particular unsupervised learning methodology.

The unlabeled data utilized within a present disclosure AI model based (at least in part) on an unsupervised learning methodology is the data input from aircraft sensors; e.g., the sensor sensing "Parameter A" and the Other Sensors. The signals from these sensors are typically input periodically at a very high-speed rate (e.g., input periodically on the order of milliseconds). Consequently, a useful size sensor signal data database is produced in a very short period of time. As stated above, during the data acquisition process the AI model unsupervised learning methodology continuously refines a model reflecting relationships between the various different sensor data inputs. In this manner, the AI model unsupervised learning methodology may be described as training, testing, and validating in real-time. For example, when Sensor A produces a particular Parameter A value, the unsupervised AI model is configured to associate parameter values from Other Sensors with that particular Parameter A value. In this manner, a set of respective parameter values received by the AI model from the sensors (e.g., via the ECU) can be used to determine a derived (e.g., predicted) parameter value for a respective parameter. For example, in some present disclosure embodiments upon request the AI model can be commanded to produce a derived Parameter A value that is derived/predicted by the AI model from the sensor data input of at least some of the Other Sensors, and in some cases sensor data input from Sensor A as well. As stated above, the sensor data input used in the unsupervised learning derivation is sensor data input collected during the then current flight mission. The sensor data input used in the derivation may be from the entirety of the current flight mission, or from a particular segment of the current flight mission, or some combination thereof. In some instances, the sensor data input used in the derivation may be from a predetermined rolling window of time just prior to a current point in time ($T_{current}$) or prior to the point in time when an event occurs ($T_{event}$); e.g., the previous "X" number of hours, or minutes, or seconds, etc. just prior to $T_{current}$ or $T_{event}$. The duration of the rolling window of time may vary depending on which parameter is being derived by the AI model.

In some embodiments of the present disclosure, the AI model may be based in part on a supervised learning methodology and in part on an unsupervised learning methodology.

The AI model's use of a database containing sensor data input collected during the then current flight mission is understood to be beneficial for a variety of reasons. For example, the data within the database is unique to the engine or engines of that aircraft, rather than an approximations, averages, or other statistically determined values from different engines/aircrafts that may differ from the engine or engines of the aircraft containing the EDR/AI model. As another example, in those instances where the AI model utilizes sensor input data from a rolling window, that sensor data will have been produced under then current environmental conditions and operating conditions. As a result, the potential for sensor data variance due to different environmental and/or operation conditions is mitigated or eliminated. As yet another example, the data within the database is developed in flight and is therefore free of any influence or corruption that may be attributable to data input from a source other than the current aircraft/engine(s); e.g., a database containing data developed in flight mitigates the possibility of intentional database corruption and thereby increases the cyber security of the system.

The following examples are provided hereinafter to illustrate the utility of the present disclosure. FIG. 2 schematically illustrates an aircraft having an engine in normal operation. Sensor A and Other Sensors are sensing parameters (e.g., as described above) from engine, the environment, or the aircraft, or any combination thereof. The sensor data produced by the sensors are communicated to the ECU which in turn communicates the sensor data to the EDR. The sensor data communicated by the ECU to the EDR may be raw data or processed data, or any combination thereof. The sensor data communicated to the EDR is used to produce a database for the AI model. As stated above, the sensor data disposed in the AI model database is from the then current flight mission, and may be from the entirety of the current flight mission, or from a particular segment of the current flight mission (e.g., a sensor data collected within a predetermined rolling window of time), or any combination thereof. In this normal operation mode, the ECU may utilize sensor data from Sensor A and the Other Sensors in the control of the aircraft and/or the aircraft engine. Also in this normal mode of operation for this embodiment, the ECU may not utilize any input from the AI model.

FIG. 3 schematically illustrates the aircraft as shown in FIG. 2. In this instance, a potential issue has been detected (e.g., detected by the ECU) with the sensor data produced by Sensor A. The potential issue may include a Sensor A that has stopped functioning, or is producing data outside of expected range, or the like. In response to the potential issue, the ECU communicates a request to the EDR for output from the AI model for a derived Parameter A value. The AI model operates to produce the derived Parameter A value based on sensor data input of at least some of the Other Sensors, and in some cases the derivation may also include sensor data input from Sensor A as well. The derivation by the AI model utilizes sensor data collected during the then current flight mission; e.g., collected during the entirety of the current flight mission, or from a particular segment of the current flight mission, or some combination thereof. In some instances, the derivation by the AI model may utilize sensor data collected at the time of request for the derived Parameter A or subsequent to the request for the derived Parameter A, but prior to the derived Parameter A value being produced. The derived Parameter A value is communicated to the ECU. The ECU may use the derived Parameter A value to evaluate the sensor data produced by Sensor A and/or may use the derived Parameter A value in place of the sensor data produced by Sensor A. In addition, the ECU may use the derived Parameter A value and the sensor data produced by Sensor A in evaluating and/or signaling a maintenance activity or other proactive action. In this manner, the present disclosure is operable to improve the performance of the ECU and likely the performance and reliability of the aircraft engine as well without the need for a redundant sensor.

FIG. 4 schematically illustrates an embodiment of the aircraft similar to that shown in FIG. 2, operating in a different manner. In this embodiment, Sensor A and Other Sensors are sensing parameters (e.g., as described above) from engine, the environment, or the aircraft, or any combination thereof. The sensor data produced by the sensors are communicated to the ECU which in turn communicates the sensor data to the EDR. The sensor data communicated by the ECU to the EDR may be raw data or processed data, or any combination thereof. The sensor data communicated to the EDR is used to produce a database for the AI model. As stated above, the sensor data disposed in the AI model database is from the then current flight mission, and may be from the entirety of the current flight mission, or from a particular segment of the current flight mission, or some combination thereof. In this embodiment, the AI model is controlled to normally provide (as opposed to providing in response to a request) a derived Parameter A value to the ECU. As stated above, the AI model operates to produce the derived Parameter A value based on sensor data input of at least some of the Other Sensors, and in some cases the derivation may also include sensor data input from Sensor A as well. The derivation by the AI model utilizes sensor data collected during the then current flight mission. The ECU may use the derived Parameter A value to evaluate the sensor data produced by Sensor A. For example, Sensor A may be producing Parameter A values within an acceptable range. In this scenario, because the Parameter A values are within acceptable range, the ECU may not detect that Sensor A is in need of maintenance, or is trending toward the need for maintenance. The ability of this present disclosure embodiment to evaluate the sensor data produced by Sensor A relative to the derived Parameter A values produced by the AI model can give an advance indication that—despite the fact that Sensor A is currently operating within specifications—Sensor A is likely to require maintenance in the near term. In this manner, the present disclosure system can facilitate timely maintenance before an actual issue arises. In addition, as stated above the ECU may be configured to utilize derived Parameter A values should the need arise. The ability of the AI model to produce a derived Parameter A value based on sensor data produced during the then current flight mission provides a level of confidence in the performance of Sensor A that may obviate the use of a redundant Sensor A. The above described embodiment is described in terms of producing a derived Parameter A value. In some instances, the same process may be followed for additional sensors to permit similar evaluations; e.g., derived Parameter B value to evaluate the performance of Sensor B, derived Parameter C value to evaluate the performance of Sensor C, etc.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method for controlling an aircraft engine, comprising:
   producing first sensor data using a first sensor sensing a first parameter during operation of the aircraft engine on a flight mission;
   producing other sensor data using a plurality of second sensors sensing a plurality of other parameters, wherein each said other parameter is different from the first parameter, during operation of the aircraft engine on the flight mission;
   providing the first sensor data and the other sensor data to a control unit during operation of the aircraft engine on the flight mission;
   storing the first sensor data and the other sensor data during operation of the aircraft engine on the flight mission;
   using an artificial intelligence (AI) model that is trained using the stored said first sensor data and said other sensor data produced during operation of the aircraft engine on the flight mission, to produce one or more derived first parameter values based on the stored other sensor data produced during operation of the aircraft engine on the flight mission; and
   selectively providing the one or more derived first parameter values to the control unit for use in controlling the aircraft engine on the flight mission.

2. The method of claim 1, wherein the one or more derived first parameter values are provided to the control unit upon a request by the control unit.

3. The method of claim 2, further comprising using the control unit to evaluate the first sensor data using the one or more derived first parameter values.

4. The method of claim 3, further comprising using the one or more derived first parameter values in the control of the aircraft engine.

5. The method of claim 1, wherein each respective second sensor of the plurality of second sensors is configured to sense a different parameter during operation of the aircraft engine on the flight mission.

6. The method of claim 1, wherein the AI model is used to produce the one or more derived first parameter values based on the stored other sensor data and the first sensor data produced during operation of the aircraft engine on the flight mission.

7. The method of claim 1, wherein the step of selectively providing the one or more derived first parameter values to the control unit includes continuously providing the one or more derived first parameter values to the control unit.

8. The method of claim 7, further comprising using the one or more derived first parameter values to evaluate the first sensor data during operation of the aircraft engine on the flight mission.

9. The method of claim 8, further comprising using the control unit to communicate information relating to the first sensor based on the evaluation.

10. The method of claim 9, wherein the information relates to maintenance.

11. The method of claim 1, wherein the first parameter is one of pressure, temperature, aircraft altitude, speed, acceleration, power, torque, weight, or aircraft ambient conditions, and each respective said other parameter is another of pressure, temperature, aircraft altitude, speed, acceleration, power, torque, weight, or aircraft ambient conditions.

12. A control system for an aircraft engine of an aircraft, the control system comprising:
   an electronic control unit (ECU);
   a first sensor disposed within the aircraft and in communication with the ECU, the first sensor configured to sense a first parameter used in the control of the aircraft engine on a flight mission, and to produce first sensor data during operation of the aircraft engine on the flight mission;
   a plurality of second sensors disposed within the aircraft and in communication with the ECU, the plurality of second sensors configured to sense a plurality of other parameters and produce other sensor data during operation of the aircraft engine on the flight mission, wherein each said other parameter is different from the first parameter; and
   an engine data recorder (EDR) in communication with the ECU, the EDR having an artificial intelligence (AI) model having a database of said first sensor data and said other sensor data;
   wherein the EDR is configured to produce one or more derived first parameter values using the other sensor data produced during the operation of the aircraft engine on the flight mission and selectively communicate the one or more derived first parameter values to the ECU for use in the control of the aircraft engine in the flight mission.

13. The control system of claim 12, wherein the one or more derived first parameter values are communicated to the ECU upon a request by the ECU.

14. The control system of claim 13, wherein the ECU is configured to evaluate the first sensor data using the one or more derived first parameter values.

15. The control system of claim 12, wherein each respective second sensor of the plurality of second sensors is configured to sense a different parameter during operation of the aircraft engine on the flight mission.

16. The control system of claim 12, wherein the AI model is configured to produce the one or more derived first parameter values based on the stored other sensor data and the first sensor data produced during operation of the aircraft engine on the flight mission.

17. The control system of claim 12, wherein the EDR is configured to continuously provide the one or more derived first parameter values to the ECU.

18. The control system of claim 17, wherein the ECU is configured to use the one or more derived first parameter values to evaluate the first sensor data during operation of the aircraft engine on the flight mission.

19. The control system of claim 18, wherein the ECU is configured to communicate information relating to the first sensor based on the evaluation.

20. The control system of claim 12, wherein the first parameter is one of pressure, temperature, aircraft altitude, speed, acceleration, power, torque, weight, or aircraft ambient conditions, and each respective said other parameter is another of pressure, temperature, aircraft altitude, speed, acceleration, power, torque, weight, or aircraft ambient conditions.

* * * * *